U. H. REED, J. LAKE & L. SISSON.
ANTIFRICTION WASHER.

No. 84,067. Patented Nov. 17, 1868.

Witnesses.
Alex F. Roberts
J. M. Carrington

Inventor:
U. H. Reed
J. Lake
L. Sisson.

per Munn & Co
Attorneys.

United States Patent Office.

U. H. REED, JEREMY LAKE, AND LUTHER SISSON, OF NORTH EASTON, MASSACHUSETTS.

Letters Patent No. 84,067, dated November 17, 1868.

IMPROVEMENT IN ANTI-FRICTION WASHERS.

The Schedule referred to in these Letters Patent and making part of the same.

*To all whom it may concern:*

Be it known that we, U. H. REED, JEREMY LAKE, and LUTHER SISSON, of North Easton, in the county of Bristol, and State of Massachusetts, have invented a new and useful Improvement in Anti-Friction Washers; and we do hereby declare that the following is a full, clear, and exact description thereof, which will enable others skilled in the art to make and use the same, reference being had to the accompanying drawings, forming part of this specification.

This invention relates to improvements in washers for vise-screws, and for other similar purposes, the object of which is to make them as frictionless as possible.

It consists of a washer, composed of two rings and a tubular section, one of the said rings and the tubular section formed to have an annular recess when joined together, which is filled with spherical balls, which take the pressure of the screw or nut from the other ring, which is held in contact with the balls by one outer annular projection taking behind an inner annular projection of the tubular section, and which is free to turn on the balls by the action of the nut when being screwed up, as will be more fully described on reference to the accompanying drawings, wherein—

Similar letters of reference indicate like parts.

Figure 1:
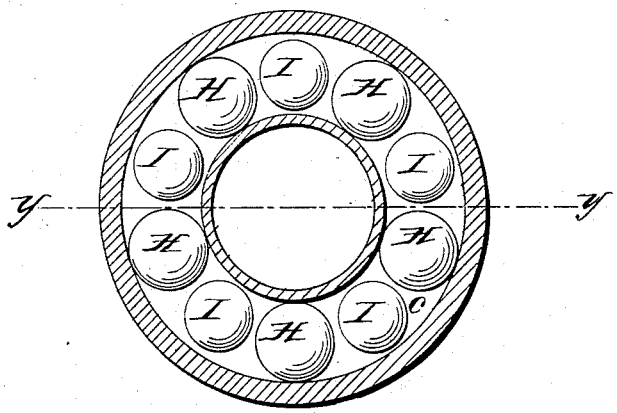
Figure 1 represents a horizontal section on the line $x\ x$ of fig. 2.
Figure 2:
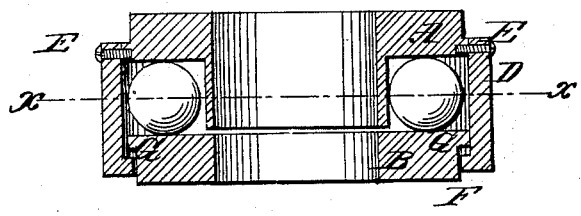
Figure 2 represents a transverse section on the line $y\ y$ of fig. 1.

A and B represent two rings, having central perforations for the bolt or shank of the screw to pass through, and are of about the same diameter.

The ring A has an annular recess, C, in one face, and a section of a tube, D, secured to its periphery by the screws E. The said tube is provided at its other end with an inwardly-projecting annular ledge, F.

The ring B is provided, at its inner end, with a corresponding annular outwardly-projecting ledge, which takes behind the ledge F, and is the means, together with the latter, of holding the ring B in its position, while allowing it to turn with reference to the ring A.

The annular recess C is provided with spherical balls, H, of a diameter slightly greater than the depth of the said recess, between which are alternate balls, I, of less diameter.

When the washer, thus constructed, is, under the action of a nut, being screwed down on a bolt or on a vise-screw, between the bearing and the shoulder of the screw, the pressure will be taken by the balls H between the two parts, and one allowed to turn with the nut or screw on the said balls, thereby very greatly reducing the friction, as will be readily understood.

The office of the smaller balls is to keep the larger ones in place, and prevent their sides coming in contact.

Having thus described our invention,

We claim as new, and desire to secure by Letters Patent—

The combination of the parts A, B, and D, and the spherical balls, substantially as and for the purpose described.

U. H. REED.
JEREMY LAKE.
LUTHER SISSON.

Witnesses:
GEO. W. KENNEDY,
EVERETT E. POOL.